United States Patent
Xie et al.

(10) Patent No.: US 12,298,974 B2
(45) Date of Patent: May 13, 2025

(54) APPARATUS, METHOD AND STORAGE MEDIUM FOR DATABASE QUERY

(71) Applicant: ZILLIZ INC., Redwood City, CA (US)

(72) Inventors: Chao Xie, Redwood City, CA (US); Yu Xie, Shanghai (CN); Xiaofan Luan, Shanghai (CN); Rentong Guo, Shanghai (CN); Xun Huang, Shanghai (CN)

(73) Assignee: ZILLIZ INC., Redwood City, CA (US)

( * ) Notice: Subject to any disclaimer, the term of this patent is extended or adjusted under 35 U.S.C. 154(b) by 0 days.

(21) Appl. No.: 18/192,381

(22) Filed: Mar. 29, 2023

(65) Prior Publication Data

US 2024/0330286 A1    Oct. 3, 2024

(51) Int. Cl.
*G06F 16/2453*    (2019.01)
*G06F 11/34*    (2006.01)
*G06F 16/242*    (2019.01)

(52) U.S. Cl.
CPC .... *G06F 16/24539* (2019.01); *G06F 11/3409* (2013.01); *G06F 16/2425* (2019.01)

(58) Field of Classification Search
CPC .......... G06F 16/24539; G06F 11/3409; G06F 16/2425
USPC ........................................................ 707/708
See application file for complete search history.

(56) References Cited

U.S. PATENT DOCUMENTS

| | | | |
|---|---|---|---|
| 9,569,496 B1 * | 2/2017 | Li | G06F 16/24535 |
| 11,281,645 B2 * | 3/2022 | Hamada | G06F 16/2255 |
| 11,669,523 B2 * | 6/2023 | Yoldemir | G06F 16/24522 707/713 |
| 2009/0012986 A1 * | 1/2009 | Arazi | G06F 16/2423 707/999.102 |
| 2009/0150366 A1 * | 6/2009 | Basu | G06F 16/284 |
| 2013/0124488 A1 * | 5/2013 | Kang | G06F 16/2458 707/693 |

(Continued)

FOREIGN PATENT DOCUMENTS

| | | | | |
|---|---|---|---|---|
| CN | 110399392 A | * | 11/2019 | ....... G06F 16/24522 |
| CN | 111274265 A | * | 6/2020 | ......... G06F 16/2425 |

(Continued)

OTHER PUBLICATIONS

Yang et al., "Pase: PostgreSQL Ultra-High-Dimensional Approximate Nearest Neighbor Search Extension", Proceedings of the 2020 ACM SIGMOD International Conference on Management of Data (SIGMOD '20), Jun. 14-19, 2020, pp. 2241-2253. (Year: 2020).*

*Primary Examiner* — Phuong Thao Cao
(74) *Attorney, Agent, or Firm* — Kim IP Law Group LLC

(57) ABSTRACT

An apparatus, a method, and a storage medium for database query. The apparatus, method, and storage medium are configured to: determine a syntax tree corresponding to an SQL query statement includes a preset subtree, wherein the preset subtree is used to indicate a query mode for querying vector data; determine a query mode according to the preset subtree and the SQL query statement; query data in a database based on the query mode to determine query results. By using an SQL query statement including a preset subtree to query a vector database, to realize an efficient approximate query, so as to avoid high access costs caused by accessing the database by using an API. Moreover, it can reduce user's understanding costs on unstructured query.

15 Claims, 6 Drawing Sheets

(56) References Cited

U.S. PATENT DOCUMENTS

| | | | |
|---|---|---|---|
| 2013/0311437 A1* | 11/2013 | Stluka | G06F 16/285 |
| | | | 707/706 |
| 2017/0193054 A1* | 7/2017 | Tang | G06F 16/24575 |
| 2018/0210907 A1* | 7/2018 | Hamada | G06F 16/3347 |
| 2019/0188302 A1* | 6/2019 | Milby | G06F 16/285 |
| 2019/0306191 A1* | 10/2019 | Chen | H04L 63/101 |
| 2019/0311051 A1* | 10/2019 | Legler | G06F 16/2453 |
| 2021/0064617 A1* | 3/2021 | Finlay | G06F 16/24542 |
| 2021/0191934 A1* | 6/2021 | Xiao | G06F 16/25 |
| 2022/0129448 A1* | 4/2022 | He | G06F 16/24564 |
| 2022/0188300 A1* | 6/2022 | Kim | G06F 16/248 |
| 2022/0414075 A1* | 12/2022 | Li | G06F 16/217 |
| 2023/0153286 A1* | 5/2023 | Chen | G06F 16/2453 |
| | | | 707/741 |
| 2024/0078234 A1* | 3/2024 | Xie | G06F 16/24542 |

FOREIGN PATENT DOCUMENTS

| | | | | |
|---|---|---|---|---|
| CN | 109542929 B | * | 11/2020 | |
| CN | 113326246 A | * | 8/2021 | .......... G06F 11/3419 |
| CN | 113918561 A | * | 1/2022 | .......... G06F 11/3409 |
| CN | 110489446 B | | 5/2022 | |
| CN | 111314388 B | * | 7/2022 | .......... G06F 16/2433 |
| CN | 115168397 A | | 10/2022 | |
| WO | WO-2017072890 A1 | * | 5/2017 | ............ G06F 16/221 |
| WO | WO-2017101398 A1 | * | 6/2017 | ............. G06F 17/30 |
| WO | WO-2018196729 A1 | * | 11/2018 | ............ G06F 16/217 |

* cited by examiner

APPARATUS, METHOD AND STORAGE MEDIUM FOR DATABASE QUERY

TECHNICAL FIELD

The disclosure relates in general to the field of computers, and more particularly, to an apparatus, method, and storage medium for database query.

BACKGROUND

In the implementation of a query database, a query of a plurality of databases can be generally performed by invoking an Application Programming Interface (API), for example, a scalar database or a vector database can be queried by invoking an API.

However, if we want to modify the parameter data of the database, it is necessary to update all the client software development toolkits (SDK) synchronously in a scenario in which the disclosure API is used as the database query interface, to implement a query of the updated database. It can be understood that each update to the SDK includes a complete testing and verification process, which presents verification costs and release risks to the customer's existing production systems.

In addition, as the functional characteristics of the database continue to iterate, the number of corresponding APIs increases for each additional functional characteristic. If the modification of the functional characteristics is not completely designed, the database functional interface provided by the historical API can conflict with the database functional interface provided by the new API. In addition, the history API can also give too much query rights, and it is difficult to reclaim the rights by adding new APIs for the opened query rights. Therefore, it is inconvenient for users to query the database. Moreover, it is difficult to change the hidden damage in the design of APIs in the database.

Therefore, querying the database by invoking the API causes high access cost and high update cost becomes a problem need to be solved.

SUMMARY

The following examples pertain to embodiments described throughout this disclosure.

One or more embodiments can include an apparatus. The processor is configured to perform a process including a memory for storing data in a database, and a processor. The processor is configured to: determine the syntax tree corresponding to an SQL query statement comprises a preset subtree, wherein the preset subtree is used to indicate a query mode for querying vector data; determine a query mode according to the preset subtree and the SQL query statement; and query the data in the database based on the query mode to determine query results.

One or more embodiments can include an apparatus, wherein determine a query mode according to the preset subtree and the SQL query statement comprises: selecting a first query algorithm from a set of preset query algorithms based on the preset subtree; determining a query mode for the vector data based on the query parameters, wherein the query parameters are indicated by the first query algorithm and the SQL query statement.

One or more embodiments can include an apparatus, wherein query the data in the database based on the query mode to determine query results comprises: determining a similarity between a query vector in the SQL query statement and the data in the database based on the first query algorithm; sorting the data in the database based on the first query algorithm and the similarity to obtain sorted data in the database; and determining query results based on the sorted data in the database and the query parameters.

One or more embodiments can include an apparatus, wherein determining a similarity between a query vector in the SQL query statement and the data in the database based on the first query algorithm, comprising: determining a distance between a query vector in the SQL query statement and the data in the database based on the first query algorithm; determining the similarity based on value of the distance.

One or more embodiments can include an apparatus, wherein: the query parameter includes a number of returned rows and a virtual column; and determining query results based on the sorted data in the database and the query parameters, comprising: determining a first query result set based on the sorted data in the database, the number of returned rows, and the virtual columns; extracting target data from the data in the database in batches based on the first query result set; and combining the first query result set and the target data to determine a second query result.

One or more embodiments can include an apparatus, wherein the processor is further configured to: determine a second query mode for scalar data according to the SQL query statement; query the data in the database based on the second query mode to obtain a third query result.

One or more embodiments can include an apparatus, wherein determine a second query mode for scalar data according to the SQL query statement, comprising: determining a query scalar, a number of returned rows, and a virtual column according to the SQL query statement; determining a third query result based on the query scalar, the number of returned rows, and the virtual column.

One or more embodiments can include an apparatus, wherein determining a third query result based on the query scalar, the number of returned rows, and the virtual column, comprises: querying the data in the database based on the query scalar and the number of returned rows to obtain a fourth query result; determining that the SQL query statement does not include a preset subtree and populating a virtual column result as a specified character, wherein the specified character includes 0; and combining the fourth query result and the virtual column result to obtain a third query result.

One or more embodiments can include an apparatus, wherein selecting a first query algorithm from a set of preset query algorithms based on the preset subtree, comprises: determining a first query algorithm from a set of preset query algorithms based on an ANNS BY subtree, wherein the set of preset query algorithms comprise a Euclidean Metric, a Manhattan Distance, and/or an inner product algorithm.

One or more embodiments can include a method performed by at least one processor. The method comprising: determining the syntax tree corresponding to an SQL query statement comprises a preset subtree, wherein the preset subtree is used to indicate a query mode for querying vector data; determining a query mode according to the preset subtree and the SQL query statement; and querying the data in the database based on the query mode to determine query results.

One or more embodiments can include a computer-readable storage medium having stored thereon instructions that, when executed on an electronic device, cause the electronic device to: determine the syntax tree corresponding to an SQL query statement comprises a preset subtree, wherein the preset subtree is used to indicate a query mode for querying vector data; determine a query mode according to the preset subtree and the SQL query statement; and query the data in the database based on the query mode to determine query results.

One or more embodiments can include a computer-readable storage medium, wherein determine a query mode according to the preset subtree and the SQL query statement comprises: selecting a first query algorithm from a set of preset query algorithms based on the preset subtree; determining a query mode for the vector data based on the query parameters, wherein the query parameters are indicated by the first query algorithm and the SQL query statement.

One or more embodiments can include a computer-readable storage medium, wherein query the data in the database based on the query mode to determine query results comprises: determining a similarity between a query vector in the SQL query statement and the data in the database based on the first query algorithm; sorting the data in the database based on the first query algorithm and the similarity to obtain sorted data in the database; and determining query results based on the sorted data in the database and the query parameters.

One or more embodiments can include a computer-readable storage medium, wherein determining a similarity between a query vector in the SQL query statement and the data in the database based on the first query algorithm, comprising: determining a distance between a query vector in the SQL query statement and the data in the database based on the first query algorithm; determining the similarity based on value of the distance.

One or more embodiments can include a computer-readable storage medium, wherein: the query parameter includes a number of returned rows and a virtual column; and determining query results based on the sorted data in the database and the query parameters, comprising: determining a first query result set based on the sorted data in the database, the number of returned rows, and the virtual columns; extracting target data from the data in the database in batches based on the first query result set; and combining the first query result set and the target data to determine a second query result.

One or more embodiments can include a computer-readable storage medium, wherein the processor further configured to: determine a second query mode for scalar data according to the SQL query statement; query the data in the database based on the second query mode to obtain a third query result.

One or more embodiments can include a computer-readable storage medium, wherein determine a second query mode for scalar data according to the SQL query statement, comprising: determining a query scalar, a number of returned rows, and a virtual column according to the SQL query statement; determining a third query result based on the query scalar, the number of returned rows, and the virtual column.

One or more embodiments can include a computer-readable storage medium, wherein determining a third query result based on the query scalar, the number of returned rows, and the virtual column, comprises: querying the data in the database based on the query scalar and the number of returned rows to obtain a fourth query result; determining that the SQL query statement does not include a preset subtree and populating a virtual column result as a specified character, wherein the specified character includes 0; and combining the fourth query result and the virtual column result to obtain a third query result.

One or more embodiments can include a computer-readable storage medium, wherein selecting a first query algorithm from a set of preset query algorithms based on the preset subtree, comprises: determining a first query algorithm from a set of preset query algorithms based on an ANNS BY subtree, wherein the set of preset query algorithms comprise a Euclidean Metric, a Manhattan Distance, and/or an inner product algorithm.

BRIEF DESCRIPTION OF THE FIGURES

The foregoing summary, as well as the following detailed description of the exemplary embodiments, will be better understood when read in conjunction with the appended figures. For the purpose of illustrating the present disclosure, there are shown in the figures embodiments, which are presently preferred. It will be understood, however, that the present disclosure is not limited to the precise arrangements and instrumentalities shown.

In the figures.

DETAILED DESCRIPTION

Figure 1:
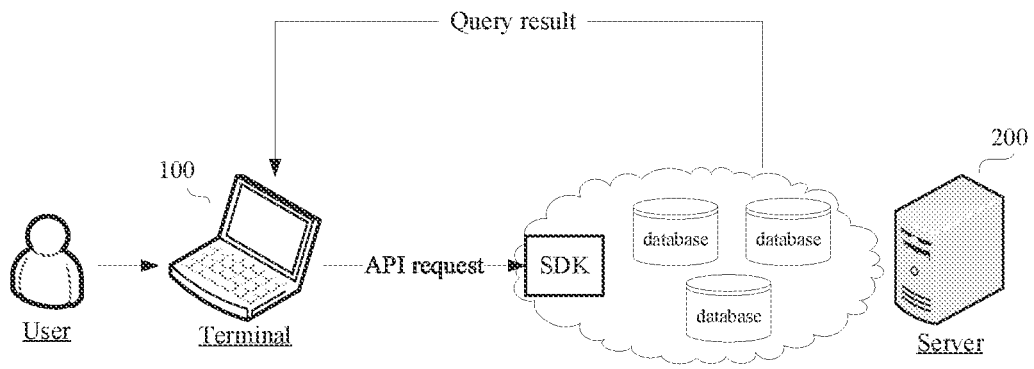
FIG. 1 illustrates a schematic diagram of a disclosure scenario for database query according to some embodiments of the present disclosure.

Reference will now be made in detail to the various embodiments of the subject disclosure illustrated in the accompanying figures. Wherever possible, the same or like reference numbers will be used throughout the figures to refer to the same or like features. It should be noted that the figures are in simplified form and are not drawn to precise scale. Certain terminology is used in the following description for convenience only and is not limiting. Directional terms such as top, bottom, left, right, above, below and diagonal are used with respect to the accompanying figures. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the figures should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, etc., is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

Illustrative embodiments of the present disclosure include, but are not limited to, an apparatus, method, and storage medium for database query.

To facilitate a person skilled in the art in understanding the schemes in the embodiments of the present disclosure, some of the concepts and terms referred to in the embodiments of the present disclosure are explained below.

(1) Vector Database

A database which can be used to store, query and analyze vectors can be used to provide a service for querying a picture using a picture, for example, similar vector data can be matched in the database based on picture feature data of each part of a face or a human body as a query vector to query a corresponding character picture; alternatively, similar vector data can be matched in the database based on picture feature data such as color, model number, and license plate number of the vehicle as query vectors to query corresponding vehicle pictures. In some embodiments of the present disclosure, the vector database can also be used to provide query services for data, such as video, audio, chemical, genetic sequence, etc.

(2) Vector

Vectors can be encoded from information in unstructured data, such as feature vectors extracted from a picture, and can be used to characterize properties such as color, shape, outline, size, display position of the picture, etc.

(3) Application Programming Interface (API)

The API itself is abstract, and it only defines one interface and does not involve details of how the disclosure is implemented. The APIs of the operating system can be used to allocate memory or read files. Many system disclosures are implemented by API interfaces, such as graphics systems, databases, Web services, and even online games. There are many different designs for disclosure program interfaces. Interfaces for fast execution typically include functions, constants, variables, and data structures. There are other ways, such as through an interpreter, or providing an abstraction layer to mask information related to an API implementation, to ensure that the code using the API adapts to the implementation changes without changes. In addition, the disclosure program interface is often part of a software development kit (SDK).

(4) Software Development Kit (SDK)

Software development kits are a collection of development tools used by software engineers to create disclosure software for a particular software package, software framework, hardware platform, operating system, etc. In general, SDKs are those used to develop disclosures under the Windows platform. It facilitates the creation of disclosures through compilers, debuggers, software frameworks, etc. It can simply provide some files of the disclosure program interface for a programming language but can also include complex hardware capable of communicating with an embedded system. Typical tools include utility tools for debugging and other uses. SDKs also often include example code, supporting technical notes, or other supporting documents that clarify doubts for basic reference materials.

(5) Euclidean Metric

It is a commonly used distance definition that refers to the true distance between two points in the m-dimensional space, or the natural length of the vector (i.e., the distance from that point to the origin). The Euclidean Metric in two and three dimensions is the actual distance between two points.

(6) Manhattan Distance

It is a distance between two points in the north-south direction plus the distance in the east-west direction, which is $d(i, j)=|x_i-x_j|+|y_i-y_j|$. It is the sum of the absolute distance of the two points on the standard coordinate system.

FIG. 1 illustrates a schematic diagram of a disclosure scenario for database query according to some embodiments of the present disclosure.

Referring to FIG. 1, a user can be an administrative user of the terminal 100, and the terminal 100 can be connected to the server 200.

The server 200 can be a cloud server, and the server 200 can provide a database storage environment. The server 200 can include an access module, such as an SDK, for providing an API interface to query a database.

The terminal 100 can be installed with a client for obtaining an API request of a user, such as a database query request. And the terminal 100 can also send the API request to the server 200. The SDK in the server 200 obtains the API request, then the SDK can query the data in the database based on the API request to obtain the query result. For example, when the API request is a query request, the data in the database can be queried based on the query request to obtain query results. Next, the server 200 returns the query result to the terminal 100 so that the user can query the database through the server 200 and acquire data information corresponding to the API request.

However, a solution for database query by invoking APIs, especially in a disclosure scenario of a vector database, often causes the following problems:

(1) If the user characteristics are added to the database, the SDK also needs to be upgraded, so that the reconstruction cost is high.

Illustratively, when the search parameters of the vector search are modified, the history parameters could be modified, new parameters could be added, and a new API can be added, thus new user characteristics can be added to the database. However, each time a user characteristic is added to the vector search, the SDKs corresponding to all the language clients need to be modified accordingly. To complete the modification of the SDKs described above, a complete test and verification is required.

(2) The database parameters are upgraded, and the SDK also needs to be upgraded, so that the risk of upgrading the user system is high.

Illustratively, each time a SDK of the client is modified, users need to upgrade the client's SDK to the latest SDK in order to use the new feature or the latest version. In this case, the existing production system of the customer needs to bear high verification cost, for example, repeated verification is required in the process of upgrading the SDK. It can also raise serious publishing risks, such as data breaches.

(3) The disclosure system accesses the database through the API interface, resulting in high access cost.

It can be understood that the database can provide a standard interface that is directly or indirectly supported, such as a Java Database Connectivity (JDBC), so that the business system within the client can easily query the database. However, in the process of accessing the database through the standard interface, the method of verifying the user right is uniform. Therefore, the access cost can be effectively reduced by invoking the standard interface to access the database. However, to implement the above standard interface, the client needs to support Structured Query Language (SQL) commands. To access the database by calling APIs, the user needs to be familiar with each API and the corresponding relationship between each API, and add code according to the corresponding relationship to enable the API to be integrated into the client and to be used.

(4) The design of APIs is confusing with iterations of functional characteristics.

It can be understood that the functional nature of the iterative process will result in a further increase in the number of APIs. If the evolution of API functions is not taken into account in each time that the user characteristics are modified, it is easy to cause the problem that the database function interface provided by the historical API conflicts with the database function interface provided by the new API. Furthermore, when historical APIs give too much query rights, it is difficult to reclaim redundant query rights by adding APIs.

In order to solve the problems of high access cost and high update cost of a database query which are caused by using APIs, the present disclosure provides a method for database query, which can be applied to a vector database. An implementation provided in accordance with an embodiment of the present disclosure can include obtaining an original SQL query statement, parsing the original SQL query statement to obtain a syntax tree, and determining whether the original SQL query statement includes a preset subtree, for example, setting a sub node of the syntax tree including the preset semantics. The preset semantics can be used to indicate a query algorithm for vector query. Thus, if it is determined that the original SQL query statement includes the preset subtree, the query of the vector data in the database can be completed based on the vector search algorithm corresponding to the preset subtree, and if it is determined that the original SQL query statement does not include the preset subtree, the query of the scalar data in the database can be completed. Therefore, the query results of the vector data and the scalar data are obtained through the SQL query statements, so that the query of the vector data and the scalar data in the whole database is realized. Further, in the process of querying the database by using the SQL query statement, if the user characteristic is added to the database, for example, the query parameter is added, only the SQL query statement needs to be modified in the process of accessing the database by the user, the access cost will be low, and the user's understanding cost of the unstructured query of the database can be reduced. On the other hand, since the SQL query statement is used to query the database, the issue risk and the verification cost of upgrading the client can be avoided at every time that the user characteristic is increased.

In some embodiments, the data in a database indicates the data stored in a database and/or the data taken from a database.

The detailed implementation flow of the method for database query provided in the present disclosure will be described in detail below with reference to the related figures.

Figure 2:
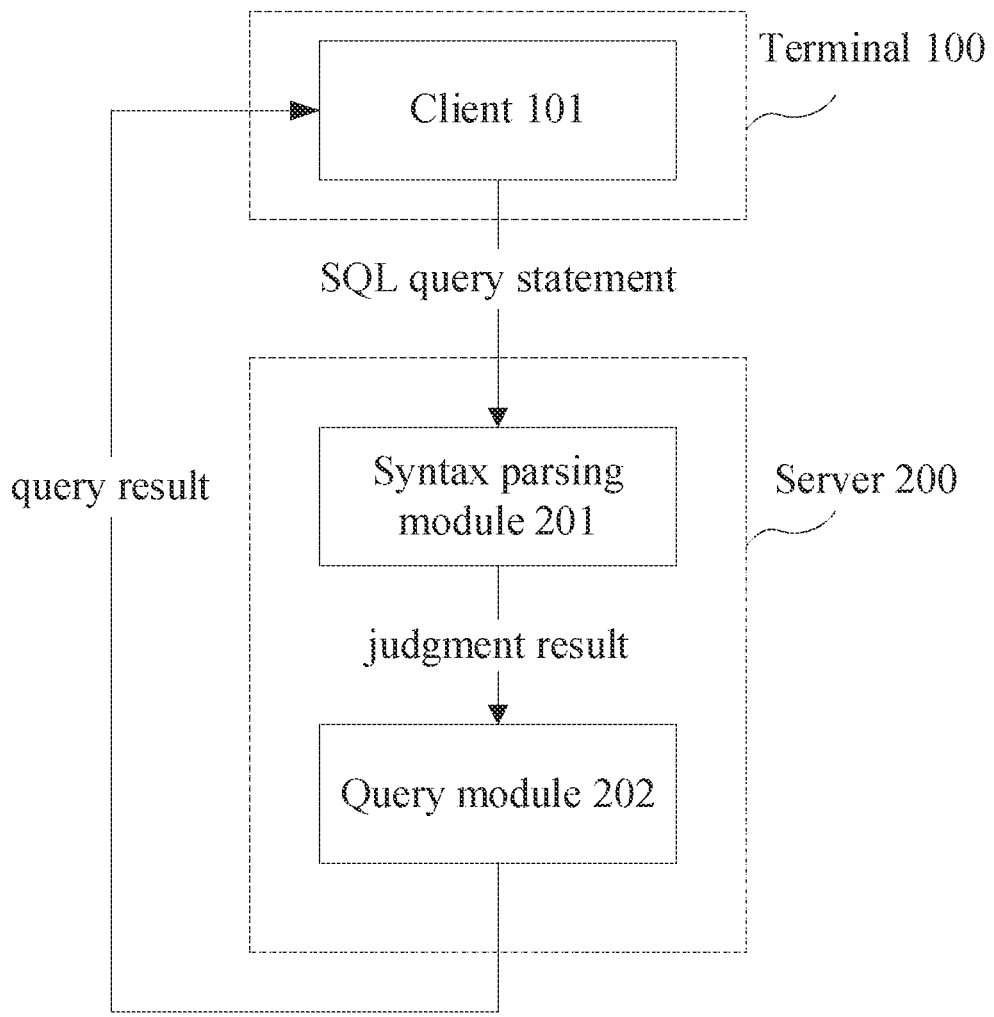
FIG. 2 illustrates a schematic diagram of a system framework for database query according to some embodiments of the present disclosure.

FIG. 2 illustrates a schematic diagram of a system framework for database query in accordance with some embodiments of the present disclosure.

Referring to FIG. 2, a Client 101 can be provided in the terminal 100, and a Syntax parsing module 201 and a Query module 202 can be provided in the server 200.

The Client 101 can be used to acquire an SQL query statement input by a user and send the SQL query statement to the server 200.

It can be understood that the above-mentioned user could be a person having management rights of the Client 101 and the terminal 100, such as a developer, a personal user database query, etc., and which is not limited herein.

The Syntax parsing module 201 in the server 200 can be configured to acquire an SQL query statement sent by the Client 101, and can parse the SQL query statement to obtain a syntax tree.

In some embodiments, the above-described Syntax parsing module 201 can be a Parser, which can convert text of a specified format, such as a character string, into a preset data structure. For example, the Parser can convert the program text of the SQL query statement into a preset data structure, which can be an Abstract Syntax Tree (AST). By converting the program text of the SQL query statement into a tree-like data structure such as an abstract syntax tree, semantic analysis processing of the SQL query statement can be efficiently realized, so that whether the abstract syntax tree includes a preset subtree can be quickly judged, and a judgment result can be quickly obtained.

The Query module 202 can be configured to acquire a syntax tree, which is obtained by analysis of the Syntax parsing module 201, and can analyze a node corresponding to each subtree in the syntax tree, and determine whether the syntax tree includes a preset subtree to obtain a judgment result.

In some embodiments, the predetermined subtree is a sub node of a syntax tree including predetermined semantics. The preset semantics can be used to indicate a query algorithm for vector query. The preset semantics include, but are not limited to, similarity matching, matching parameters, automatic sorting based on an algorithm specified by a user, taking query results of the first k pieces of sorting, and the value of the distance (i.e. Distance). For example, when it is determined that the syntax tree includes the preset subtree, since the preset subtree includes similarity matching, matching parameters, automatic sorting based on an algorithm specified by a user, and taking query results of the first k pieces of sorting, and the value of the distance (i.e. Distance), in this case, the Query module 202 can query vector data in the database based on the query algorithm selected in the SQL query statement, and perform similarity matching, matching parameters, automatic sorting based on the preset algorithm, and taking query results of the first k pieces of sorting, and the value of the distance. Further, the query result of the vector data is determined, and the query result is returned to the Client 101.

It can be understood that the determination result includes determining that the syntax tree includes a predetermined subtree and determining that the syntax tree does not include a predetermined subtree.

The Query module 202 can also perform a corresponding query operation based on the judgment result and the algorithm in the SQL query statement to obtain query results, and return the query result to the Client 101. In some embodiments, in order to determine that the syntax tree includes a preset subtree, the Query module 202 can perform a query operation on the vector data in the database based on the algorithm in the SQL query statement to obtain query results. If it is determined that the syntax tree does not include the preset subtree, the Query module 202 can execute the query operation on the vector data in the database based on the algorithm in the SQL query statement to obtain the query result.

Figure 3:
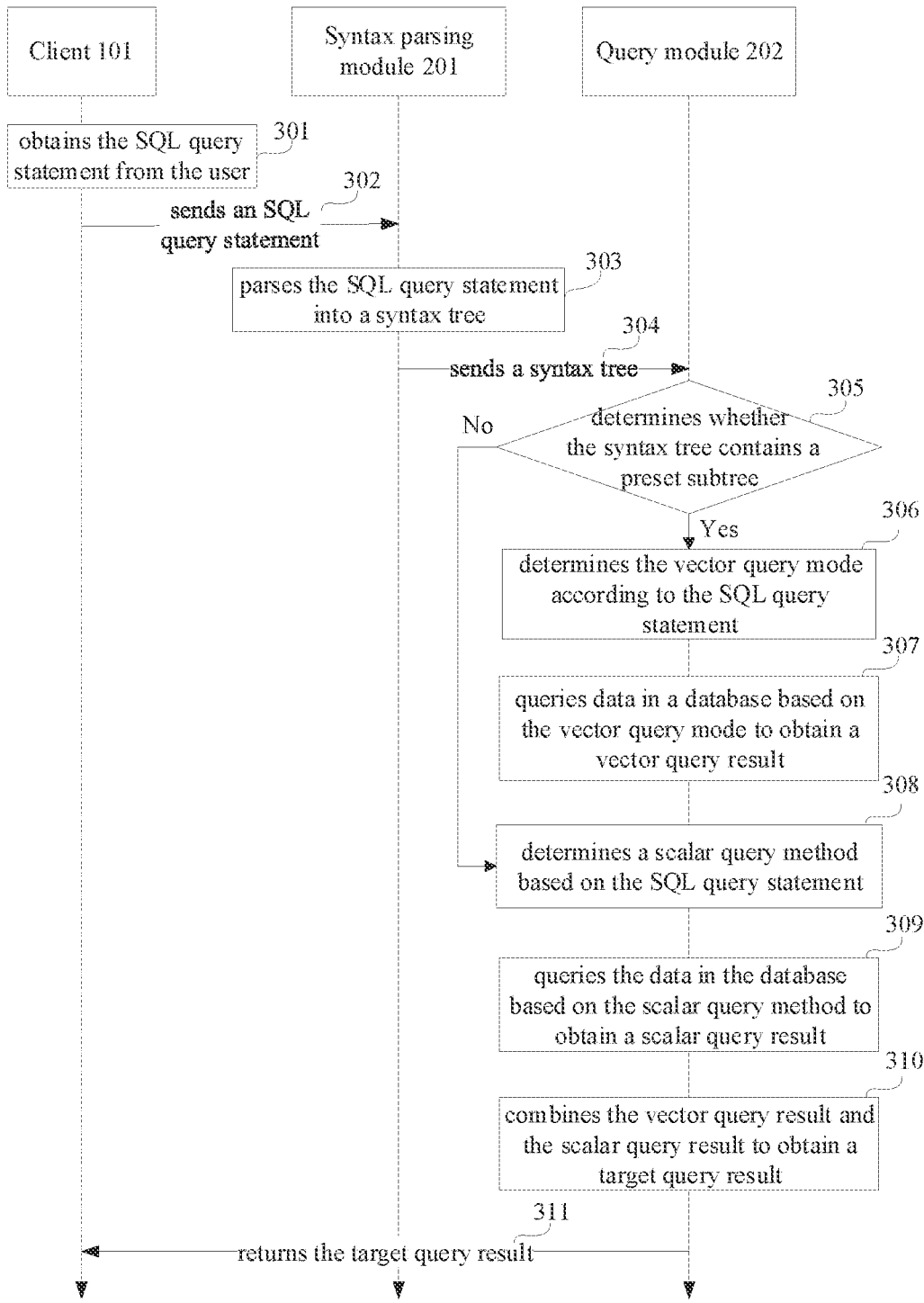
FIG. 3 illustrates a schematic flow diagram of a method for database query according to some embodiments of the present disclosure.

Based on the system framework structure for database query illustrated in FIG. 2, FIG. 3 illustrates a schematic flow diagram of a method for database query according to some embodiments of the present disclosure.

Referring to FIG. 3, the above process scheme includes:

301, the Client 101 obtains the SQL query statement from the user.

Illustratively, a service system can be installed within the Client 101 for accessing and accessing the database. It can be understood that such databases include, but are not limited to, vector databases and scalar databases. The service system in the Client 101 can be used to provide the user with an interface for inputting SQL query statements, and further obtain the SQL query statements inputted by the user through the above interface.

302, the Client 101 sends an SQL query statement to the Syntax parsing module 201.

Illustratively, the Client 101 can establish a network connection with the server 200 in a wired or wireless manner, and further transmit the SQL query statement to the Syntax parsing module 201 in the server 200 through the above-mentioned network connection, so as to parse the SQL query statement to obtain a syntax tree.

It can be understood that the subtree names in the syntax tree are different, and the preset subtree can be preset in advance, so that the Query module 202 can execute different query modes in two execution environments in which the syntax tree includes the preset subtree and the preset subtree does not include the preset subtree, thereby realizing parallel query of the vector data and the scalar data in the database.

303, the Syntax parsing module 201 parses the SQL query statement into a syntax tree.

Illustratively, the Syntax parsing module 201 can be a syntax parser (Parser), which can convert a text of a specified format, such as a character string, into a preset data structure. For example, the parser can convert the program text of the SQL query statement into a preset data structure, which can be an Abstract Syntax Tree (AST). By converting the program text of the SQL query statement into a tree-like data structure such as an abstract syntax tree, semantic analysis processing of the SQL query statement can be efficiently realized, so that whether the abstract syntax tree includes a preset subtree can be quickly judged, and a judgment result can be quickly obtained.

The syntax tree is described in detail below with reference to FIG. 4.

Figure 4:
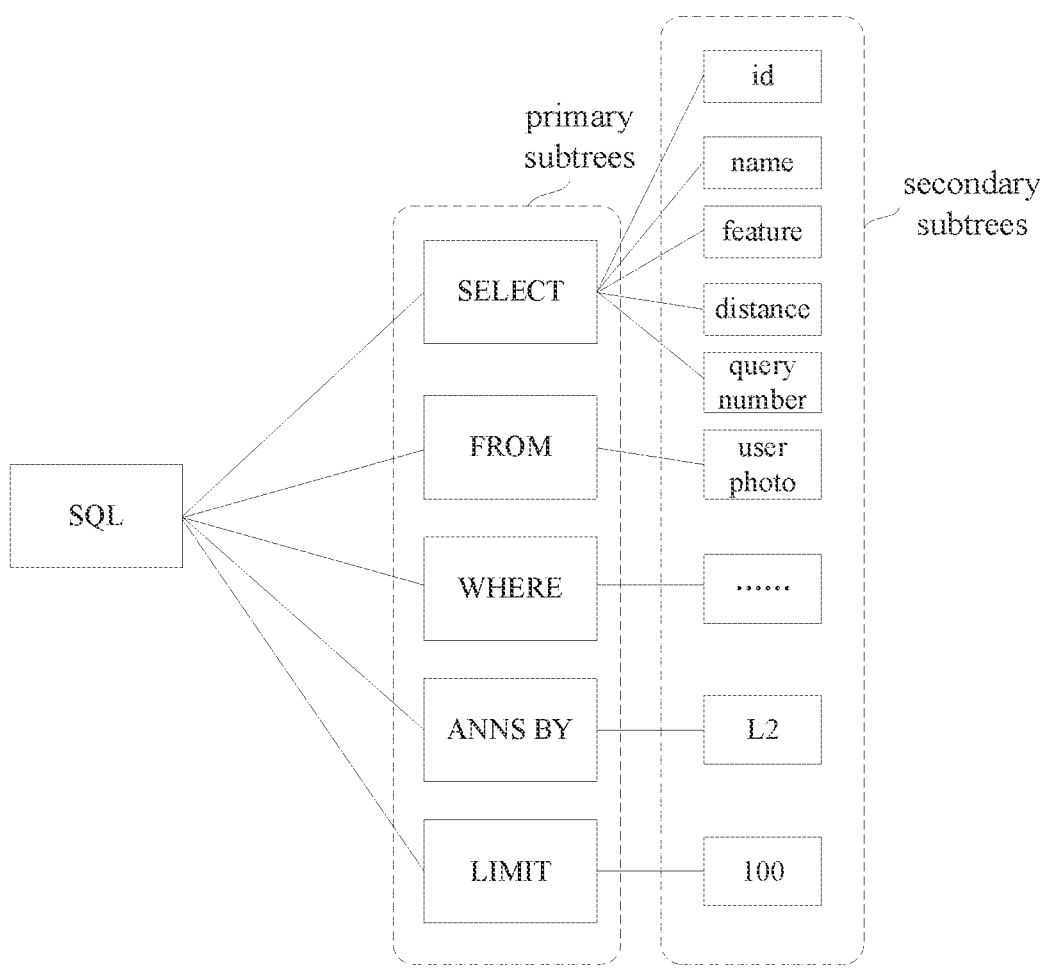
FIG. 4 illustrates a tree structure of a syntax tree according to some embodiments of the present disclosure.

FIG. 4 illustrates a tree-like structure of a syntax tree according to some embodiments of the present disclosure.

Illustratively, a SELECT statement is taken as the SQL query statement:

SQL
SELECT t.id, t.name, t.feature, distance, query_number
FROM user_photo t
WHERE t.id>=1000 AND t1.id<=10000
ANNS BY L2 (feature, [0.23, 0.121, . . . ], '{nprobe:64, ef: 2}')
LIMIT 100

Referring to FIG. 4, the syntax tree shown in FIG. 4 can be obtained after parsing by the Syntax parsing module 201. In the example query statement, there are five primary subtrees, including SELECT, FROM, WHERE, ANNS BY, and LIMIT; and there are multiple second subtrees under the five first subtrees. For example, the following secondary subtrees are included under the SELECT subtree: t.id subtree, t.name subtree, t.feature subtree, distance subtree, and query number subtree. By parsing into a plurality of subtrees of different levels, a preset subtree can be quickly identified. For example, the ANNS BY subtree in the figure is a preset subtree. In some embodiments of the present disclosure, the ANNS BY subtree can be made to include similarity matching, matching parameters, automatic sorting based on a preset algorithm, query semantics of query results of the first k query results and the value of the distance. For example, using the ANNS BY subtree combined with the secondary subtree L2 can realize the query semantics, which include similarity matching of the data in the database based on the Euclidean Metric indicated by L2, sorting the distance of the data in the database from small similarity to large similarity automatically based on the Euclidean Metric, and taking query results of the first k pieces of sorting. Further, it can realize querying the vector data in the vector database based on the SQL statement, and using one kind of syntax to express the unique feature of approximate matching in the vector data query.

As an example of the above-mentioned SQL statement "WHERE t.id>=1000 AND t1.id<=10000", it can be understood that the WHERE is a conventional syntax in the SQL query statement for querying the data in the database based on scalar data, for example, the "id" value, and the syntax of the WHERE subtree is generally implemented in such a manner that an overloaded operator (also known as Operator) is added between the a value and the b value, so that the scalar indicated by the SQL query statement is matched with the scalar of the data in the database, and a result value is queried. However, it is difficult to realize matching query of vector data by such syntax. The matching query of the vector data is to obtain a query vector provided by a user, calculate a distance from the vector data in the database based on the query vector, and determine a corresponding result value. However, queries for vector data cannot be implemented based on conventional SQL syntax. Thus, the preset subtree can be used to indicate query processing of the vector data, so that the SQL statements can express approximately matching characteristics in the vector data query. It can be understood that the FROM in the first level subtree is used to represent the data range of the SQL query the data in the database, e.g., "user_photo t" is used to indicate the data in the database within the user album t, i.e., the SQL query the data in the database within the user album t.

It can be understood that the WHERE in the first subtree is used to select the data in the database having an id value greater than or equal to 1000 and less than or equal to 10000. It can be understood that the data in the database can be queried based on the scalar "id" by the WHERE subtree.

It can be understood that the LIMIT in the first subtree is used to indicate the maximum amount of data that can be returned from the resulting result set, for example, "LIMIT 100" is used to indicate that a maximum of 100 pieces of result data can be returned to the user from the result data obtained from the SQL query.

It can be understood that the SELECT in the first level subtree is used to indicate a selection parameter for selecting query results from the data in the database, for example, selecting a content to be queried based on a column name.

In some embodiments, the secondary subtree under the primary subtree SELECT subtree is used to indicate a column name for querying the data in the database.

Referring to the SQL query statement above, "t" in the "t.id" subtree for indicating columns in the data in the database table, "id" is a column name, i.e. "t.id" can be used to indicate id columns in the data in the database table, and can be used to query the data in the database based on id.

Similarly, the "t.name" subtree is used to indicate the name column in the data in the database table, and can be used to query the data in the database based on the name. The "t.feature" subtree is used to indicate Feature columns in the data in the database table, and can be used to query the data in the database based on the Feature. "The distance" subtree is used to indicate the Distance column in the data in the database table, and can be used to query the data in the database based on the value of the distance.

The "query number" subtree can be used to indicate query results corresponding to different query vectors. For example, when 1-N vectors are used for matching, it is possible to return that each row of result data is a matching result from the several input vectors, where N is greater than 0, and N is a positive integer.

It can be understood that the specific implementation of the query processing by using the "query number" subtree will be described in detail below and will not be described in detail herein.

It can be understood that the above-described calculation process for determining the corresponding feature vector from the picture data can be implemented in any manner, and details are not described herein.

It can be understood that the secondary subtree can be written into the SQL query statement by the user based on the query requirements form the user to satisfy the query requirements for data of different column names of the database, and the column names of the subtree are not limited herein.

304, the Syntax parsing module 201 sends a syntax tree to the Query module 202.

Illustratively, after parsing the SQL query statement is completed by the Syntax parsing module 201, a syntax tree is obtained, and the syntax tree is sent to the Query module 202 so that the Query module 202 can query the data in the database based on the syntax tree.

In some embodiments, referring to FIG. 4 above, the Query module 202 can complete a query for the data in the database based on a primary subtree and a secondary subtree, and the LIMIT subtree can be used to limit the query results of the SELECT statement to return a specified number of records. For example, if the first subtree LIMIT is read, the first 100 query results in the query result set can be selected based on the second subtree 100 of the LIMIT subtree, and the first 100 query results in the query result set can be returned to the Client 101 in the process of querying the database.

305, the Query module 202 determines whether the syntax tree contains a preset subtree.

Illustratively, the Query module 202 can determine whether a predetermined subtree is contained within the syntax tree by reading the name of the subtree.

It can be understood that the preset subtree is a sub-node of a syntax tree including a preset semantics, and can be, for example, an ANNS BY subtree.

As an example of the above-mentioned SQL statement "WHERE t.id>=1000 AND t1.id<=10000", it can be understood that the WHERE is a conventional syntax in the SQL query statement for querying the data in the database based on scalar data, for example, the "id" value, and the syntax of the WHERE subtree is generally implemented in such a manner that an overloaded operator (Operator) is added between the a value and the b value, so that the scalar indicated by the SQL query statement is matched with the scalar of the data in the database, and a result value is queried. However, it is difficult to realize matching query of vector data by such syntax. The matching query of the vector data is to obtain a query vector provided by a user, calculate a distance from the vector data in the database based on the query vector, and determine a corresponding result value. However, queries for vector data cannot be implemented based on conventional SQL syntax.

Thus, some embodiments of the present disclosure can provide a preset syntax, i.e., a preset subtree, e.g., an ANNS BY subtree. The preset subtree can include query semantics, which can include similarity matching, matching parameters, automatic sorting based on a preset algorithm, taking query results of the first k pieces of sorting, and the value of the distance. Further, it can realize querying the vector data in the vector database based on the SQL statement, and using one kind of syntax to express the unique feature of approximate matching in the vector data query.

On the one hand, an approximate query of the vector data in the database can be implemented by using the ANNS BY subtree combined with the SQL query statement. On the other hand, it is also possible to enable the user to quickly master the query mode of vector data similarity matching, improve the query experience of the user, and effectively reduce the cost of understanding the unstructured query of the database by the user. On the other hand, since the SQL query statement is applied to query the database, when a new user characteristic occurs, such as a new vector query algorithm, it is only necessary to specify a new vector query algorithm after the ANNS BY subtree to execute the corresponding query processing, so that the new user characteristic can be easily implemented to access the database, and the high cost of accessing the database by using the API is avoided.

306, the Query module 202 determines the vector query mode according to the SQL query statement.

Illustratively, the vector query methods include, but are not limited to, algorithms and query parameters for querying vector data.

In some embodiments, the SQL query statement "ANNS BY L2 (feature, [0.23, 0.121, . . . ], '{nprobe:64, ef: 2}')" It can be understood that after the ANNS BY subtree is detected here, the subtree "L2" after the ANNS BY can be confirmed as the vector query mode. Where L2 is a Euclidean Metric for instructing the query vector data to obtain a result set, the Query module 202 can follow an approximate query manner of the Euclidean Metric to complete the query process. Subtree "(feature, [0.23, 0.121, . . . ], '{nprobe:64, ef: 2}')" can be used to define query parameters, for example, the feature value feature corresponding to the feature vector can be a set [0.23, 0.121, . . . ]. In this case, after the ANNS BY is detected, the query manner of the vector data can be determined based on the entire SQL query statement.

It should be noted that there are three query modes of the vector database according to the embodiment of the present disclosure:
(1) Search, which is used to find the "limit" number of vectors which are most similar to the specified vectors and returning;
(2) RangeSearch, which is used to provide a minimum or maximum distance, and look up all data within the required distance range from the specified vector;
(3) Query, which is used to obtain data by using a scalar filtering condition.

It can be understood that "ef" can be query parameters and can be used to define parameters in a vector query process.

Therefore, in some embodiments, if the ANNS BY subtree can be detected, the search processing of the preset vector search mode can be performed based on the SQL statement, and the preset vector search mode can include Search, RangeSearch, and Query.

307, the Query module 202 queries data in a database based on the vector query mode to obtain a vector query result.

Illustratively, the Query module 202 queries the data in the database using the vector query method determined in step 306 above to obtain a vector query result.

It can be understood that the vector query result can be a result set, which includes a plurality of query results, wherein the result set includes at least one query result.

It can be understood that, in some embodiments, after the step of implementing step 307, steps 308 to 311 below can be performed to effect synchronization of the vector data and scalar data in the query database.

308, the Query module 202 determines a scalar query mode based on the SQL query statement.

It can be understood that if the Query module 202 determines that the SQL query statement does not include the preset subtree, the vector query processing cannot be performed, and the scalar query mode can be determined according to the SQL query statement. For example, the scalar query result can be selected from the table of the database according to the scalar column.

309, the Query module 202 queries the data in the database based on the scalar query mode to obtain a scalar query result.

Illustratively, the Query module 202 queries the data in the database based on the scalar query mode determined in step 308 above, and can obtain scalar query results.

It can be understood that the scalar query results can be a result set, which includes a plurality of query results, wherein the result set includes at least one query result.

310, the Query module 202 combines the vector query result and the scalar query result to obtain a target query result.

Illustratively, since there are two query modes for querying the vector and querying the scalar, the vector query result and the scalar query result can be merged into one list to form a target query result, so as to provide the target query result to the user.

It can be understood that when the Query module 202 determines that the SQL query statement does not include the preset subtree, it is not necessary to query the vector data. At this time, the scalar query result can be fed back to the Client 101 as the target query result.

311, the Query module 202 returns the target query result to the Client 101. Illustratively, the Query module 202 can send the target query results to the Client 101 in a wired or wireless manner, so that the Client 101 can provide the target query results to the user to complete the query processing of the database.

It can be understood that through the method of querying the database in the above steps 301 to 311, wherein acquiring the SQL query statement from the user, parsing the SQL query statement into a syntax tree, judging whether the syntax tree includes a preset subtree, and if it is detected that the syntax tree includes a preset subtree, determining the vector query mode based on the SQL query statement to complete query processing of the vector data; if it is detected that the syntax tree does not include the preset subtree, determining the scalar query mode based on the SQL query statement to complete query processing of the scalar data. On the one hand, it is realized that the SQL query statement is used to complete the synchronous query of the vector data and the scalar data in the database. Compared with the method of accessing the database by the disclosure API, the access cost is effectively reduced, and the disclosure complexity of the user is reduced, thereby reducing the user's understanding cost of the unstructured query of the database. On the other hand, by setting the multiple approximation algorithm semantics of the preset subtree, the SQL statement can realize the approximation algorithm in the vector query, so that the user can perform accurate query on the vector data in the database, and the user experience is effectively improved.

The embodiments of steps 306 to 307 above are described in further detail below in connection with FIG. 5.

Figure 5:
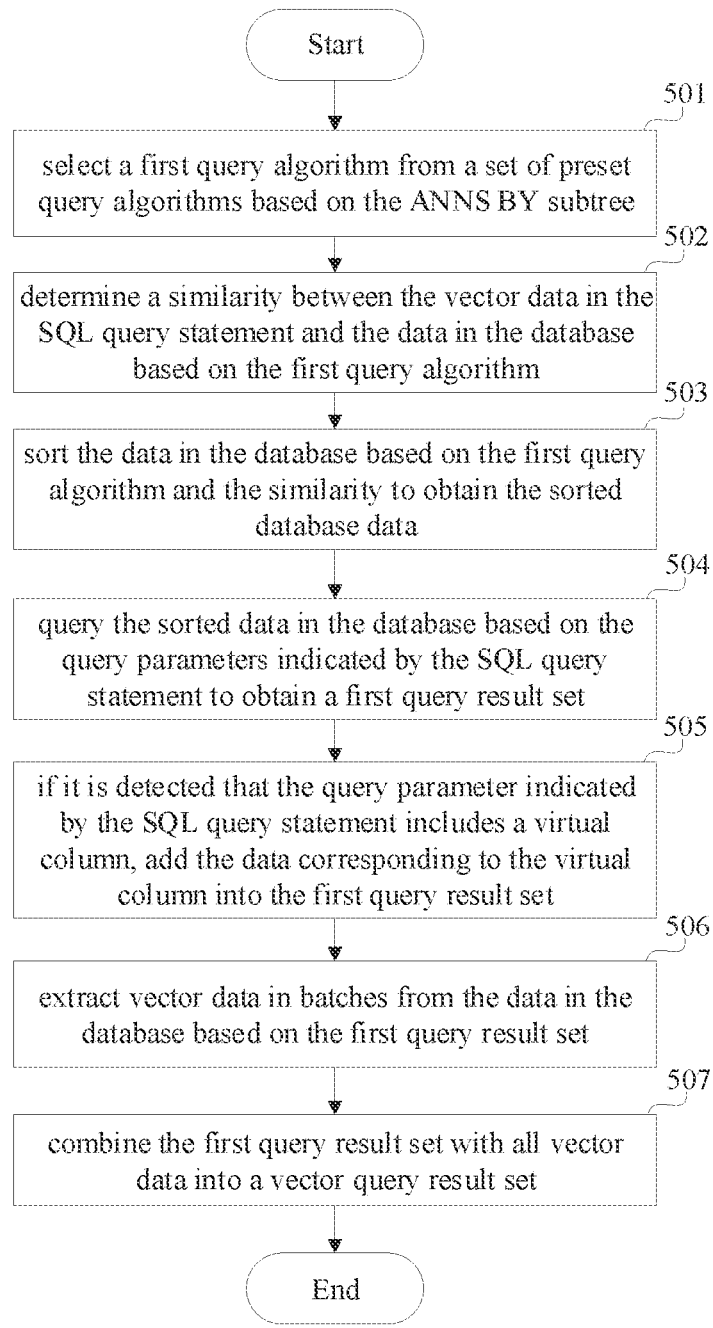
FIG. 5 illustrates a schematic diagram showing a specific implementation flow of obtaining a vector query result set according to some embodiments of the present disclosure.

FIG. 5 illustrates a schematic diagram of a specific implementation flow of obtaining a vector query result set according to some embodiments of the present disclosure. It can be understood that the execution body of each step of the flow shown in FIG. 5 can be the Query module 202 described above, and details of the execution body of a single step will not be described.

As shown in FIG. 5, the implementation scheme includes the following steps:

501, select a first query algorithm from a set of preset query algorithms based on the ANNS BY subtree.

Illustratively, the first query algorithm can be selected from the set of preset query algorithms based on the code content in the ANNS BY subtree for querying the vector data in the database. Wherein the preset query algorithm set includes at least two vector query algorithms, such as the Euclidean Metric, the Manhattan Distance, and/or the inner product algorithm.

502, determine a similarity between the vector data in the SQL query statement and the data in the database based on the first query algorithm.

Illustratively, the score data corresponding to the value of the distance of each data in the database of the user-specified vector data in the SQL query statement is determined according to the first query algorithm, and the similarity is determined. It can be understood that the above value of the distance can be used to determine the similarity between the two vectors, and the smaller the value of the distance, the higher the similarity.

In some embodiments, the distance between the user-specified vector data and each of the data in the database can be calculated based on the Euclidean Metric, and the smaller the value of the distance, the higher the similarity.

503, sort the data in the database based on the first query algorithm and the similarity to obtain the sorted data in the database.

Illustratively, the first query algorithm described above includes, but is not limited to, the Euclidean Metric, the Manhattan Distance, and the inner product algorithm.

It can be understood that the score data of the approximate distance of the vector can be obtained as similarity based on the Euclidean Metric and the Manhattan Distance; the score data of the inner product of the vector can be obtained as similarity by the inner product algorithm.

For example, the similarity between the vector data in the database and the query vector given by the user can be evaluated based on the score data, so that all the data in the database can be sorted with reference to the similarity. For example, if the data in the database with the highest similarity is ranked first, the query result required by the user can be easily determined. Therefore, it can realize accurate vector data query.

In some embodiments, assume that the user specifies "LIMIT" as 10, which indicates the query requirements from the user to pick the 10 result data with the highest similarity. Thus, it is possible to sort 100,000 pieces of data in the database by similarity, so that it can determine the first 10 pieces of data to be sorted to satisfy the query requirement for the user, which is selecting the 10 pieces of result data with the highest similarity. Thereby, it can realize an effective vector data query.

It can be understood that if the user uses the "ORDER BY", which is a conventional syntax in the SQL query statement, the sorting manner can be defined by the user. The result data can be arranged in a positive order based on the sorting parameters, and the result data can also be arranged in an inverse order based on the sorting parameters. However, in the process of performing the vector data query, it is necessary to determine the sorting mode based on the algorithm itself corresponding to the query mode. For example, if the Euclidean Metric is taken as the algorithm matching the input query vector and the vector data in the database, the smaller the value of the distance, the higher the similarity. Therefore, to achieve the purpose of similarity matching, it is necessary to arrange the result data with high similarity first so that the returned result data can be with high similarity. If the user defines the ranking of the result data with low similarity, it is contrary to the principle of the Euclidean Metric query algorithm itself. Therefore, the "ANNS BY" subtree makes it possible to sort the result data by the algorithm itself in the entire vector query process, to avoid the user defining the sorting mode of the result data in the SQL query statement incorrectly, reduce the user's understanding cost of the vector query, and further reducing the user's understanding cost of the unstructured query of the database.

504, query the sorted data in the database based on the query parameters indicated by the SQL query statement to obtain a first query result set.

Illustratively, the syntax subtree in the SQL query statement can be used to instruct the query parameters to query the sorted data in the database, e.g., to determine the query result selected by the user based on the assignment of "LIMIT", thereby obtaining the first query result set.

505, if it is detected that the query parameter indicated by the SQL query statement includes a virtual column, add the data corresponding to the virtual column into the first query result set.

Illustratively, in the process of querying the sorted data in the database based on the query parameters, the query items indicated by the virtual column can be queried, and the data corresponding to the virtual column can be added to the first query result set to support querying of a plurality of input query vectors, to obtain result data corresponding to the input query vectors. For example, the virtual column "distance" can be used to determine a distance scoring parameter by the virtual column; the virtual column "inner_product" can be used to determine the scoring parameter of the inner product of the vector by the virtual column; the virtual column "query_number" can be used to return the matching result of each row of data from the query vector of the last input when the data in the database is queried using 1-N query vectors.

In some embodiments, the vector data stored in the vector database can be used for picture queries, i.e., similar pictures in the vector database can be queried with known picture data. Assume that the user determines the corresponding feature vector X2 based on the X1 picture and determines the corresponding feature vector Y2 based on the Y1 picture, it is possible to use the feature vector X2 and the feature vector Y2 as query vectors. For example, the feature vector X2 can be listed before the feature vector Y2 to sequentially query the vector data in the database, and then 100 pieces of corresponding query results can be obtained. Wherein the first 30 pieces of result data can be matching results corresponding to the previously queried feature vector X2, and tag "query number" to be 1, which can indicate that the first 30 pieces of picture data are result data matching the first queried feature vector X2; the last 70 pieces of picture data can be matching results corresponding to the feature vector Y2 of the subsequent query, and tag "query number" to be 2, which can indicate that the last 70 pieces of picture data are result data matching the feature vector Y2 of the second execution query. Therefore, the result data obtained by corresponding query of different query vectors can be effectively distinguished.

506, extract vector data in batches from the data in the database based on the first query result set.

It can be understood that after a query of the data in the database in general, a result set can be obtained, which can exist in a table form, and which generally does not include the metadata in the database. Therefore, to obtain the metadata, it is necessary to input the code corresponding to the call instruction, to call the metadata from the corresponding storage location of the database based on the obtained result set.

In some embodiments of the present disclosure, the corresponding vector data can be extracted in batches from the data in the database based on the first query result set, for example, the vector data can be extracted in batches from the database storage location based on "id" data corresponding to the vector column in the first query result set. Therefore, the redundant operation generated by the user to extract the vector data can be avoided, and the user query efficiency can be improved.

507, combine the first query result set with all vector data into a vector query result set.

It can be understood that the first query result set and all the extracted vector data are returned to the Client 101 together, so that the user can perform query processing and extraction processing on the vector data through a SQL query statement, thereby improving the database query efficiency of the user.

It can be understood that through the specific implementation flow of the query database in the above steps 501 to 507, the first query algorithm is selected from the preset query algorithm set based on the ANNS BY subtree, determine the similarity between the vector data in the SQL query statement and the data in the database based on the first query algorithm; sort the data in the database based on the similarity to obtain the sorted data in the database; query the sorted data in the database based on the query parameters indicated by the SQL query statement and obtain the first query result set; if detect that the query parameters indicated by the SQL query statement include the virtual columns, add the data corresponding to the virtual columns to the first query result set, and extract the vector data from the data in the database in batches based on the first query result set. Therefore, the approximate query processing of the database vector data by the SQL query statement is realized through the ANNS BY subtree, and the query processing and extraction processing of the vector data in the database by the single SQL query statement is realized, thereby effectively improving the database query efficiency of the user.

The embodiments of steps 308 to 309 above are described in further detail below in connection with FIG. 6.

Figure 6:
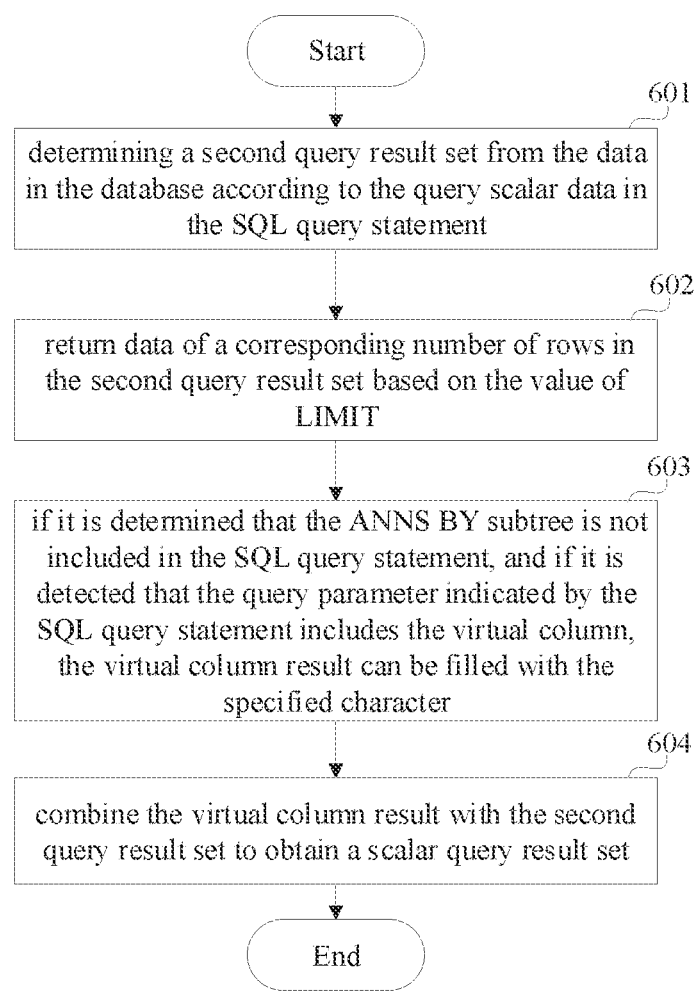
FIG. 6 illustrates a schematic diagram showing a specific implementation flow of obtaining a scalar query result set according to some embodiments of the present disclosure.

FIG. 6 illustrates a schematic diagram of a specific implementation flow of obtaining a scalar query result set according to some embodiments of the present disclosure. It can be understood that the execution body of each step of the flow shown in FIG. 6 can be the Query module 202 described above, and details of the execution body of a single step will not be described.

601, determine a second query result set from the data in the database according to the query scalar data in the SQL query statement.

Illustratively, the data in the database can be queried based on scalar data, and the second query result set can be filtered from the data in the database based on the query scalar data in the SQL query statement.

It can be understood that, as an example of the above-described SQL statement "WHERE t.id>=1000 AND t1.id<=10000", the "id" value in the scalar data can be selected to query the data in the database to select the data in the database with the "

602, return data of a corresponding number of rows in the second query result set based on the value of LIMIT.

Illustratively, based on the value K of LIMIT in the SQL query statement, it can be determined that the data of the K rows before sorting in the second query result set is returned to the Client 101.

603, if it is determined that the ANNS BY subtree is not included in the SQL query statement, and if it is detected that the query parameter indicated by the SQL query statement includes the virtual column, the virtual column result can be filled with the specified character.

It can be understood that when the ANNS BY subtree is not included in the SQL query statement, the query processing of the database is only scalar query processing. Since the virtual column is used to indicate an approximate query of vector data, the virtual column result can be filled with a specified character to characterize an error in the algorithm herein, for example, the virtual column result can be filled with 0. Thus, a query failure, such as a query interruption, caused by generating an error is avoided.

604, combine the virtual column result with the second query result set to obtain a scalar query result set.

Illustratively, by merging the virtual column result with the second query result set, a scalar query result set can be obtained, wherein the virtual column result can be filled with a specified character to represent an error of the algorithm here, so as to complete query processing of the database scalar data.

It can be understood that according to the specific implementation flow of the query database in the above steps 601 to 604, the second query result set is filtered from the data in the database according to the preset scalar data in the SQL query statement, and the data of the corresponding number of rows in the second query result set is returned based on the value of LIMIT to determine that the SQL query statement does not include the ANNS BY subtree, and the query parameter indicated by the SQL query statement is detected to include the virtual column, the virtual column result is filled with the specified character, and the virtual column result is merged with the second query result set to obtain the scalar query result set. Therefore, the synchronous query processing of the scalar data and the vector data of the database is realized through the SQL query statement.

Some embodiments of the present disclosure also provide an electronic device comprising a memory for storing instructions for execution by one or more processors of the electronic device, and a processor that is one of the one or more processors of the electronic device for performing the above-described database query method.

Figure 7:
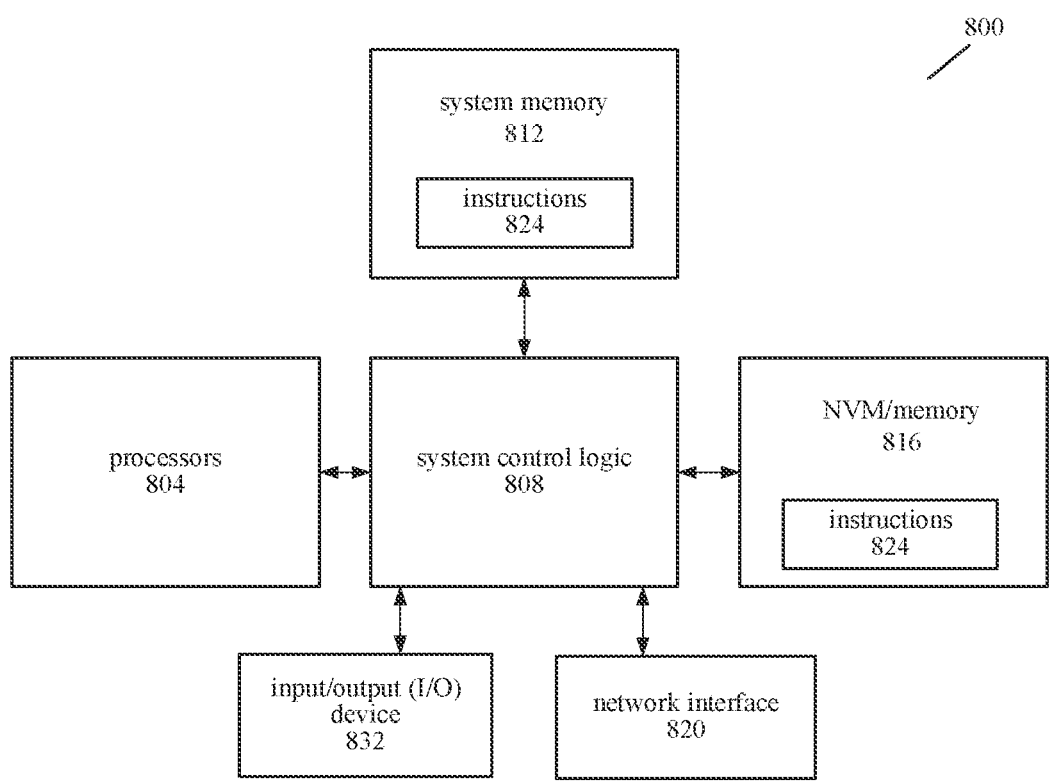
FIG. 7 illustrates a block diagram of an electronic device according to some embodiments of the present disclosure.

FIG. 7 illustrates a block diagram of an electronic device according to some embodiments of the present disclosure. In one embodiment, electronic device 800 can include one or more processors 804, system control logic 808 coupled to at least one of processors 804, system memory 812 coupled to system control logic 808, non-volatile memory (NVM) 816 coupled to system control logic 808, and a network interface 820 coupled to system control logic 808.

In some embodiments, processor 804 can include one or more single-core or multi-core processors. In some embodiments, processor 804 can include any combination of a general purpose processor and a special purpose processor (e.g., a graphics processor, a disclosure processor, a baseband processor, etc.). In embodiments in which the electronic device 800 employs an eNB (Evolved Node B) 101 or an RAN (Radio Access Network) controller 102, the processor 804 can be configured to perform various compliant embodiments.

In some embodiments, the system control logic 808 can include any suitable interface controller to provide any suitable interface to at least one of the processors 804 and/or any suitable device or component in communication with the system control logic 808.

In some embodiments, system control logic 808 can include one or more memory controllers to provide an interface to system memory 812. System memory 812 can be used to load and store data and/or instructions. The memory 812 of the electronic device 800 can include any suitable volatile memory, such as a suitable dynamic random access memory (DRAM), in some embodiments.

NVM/memory 816 can include one or more tangible, non-transitory computer-readable media for storing data and/or instructions. In some embodiments, the NVM/memory 816 can include any suitable non-volatile memory such as flash memory and/or any suitable non-volatile storage device, such as at least one of an HDD (Hard Disk Drive), a CD (Compact Disc) drive, a DVD (Digital Versatile Disc) drive.

The NVM/memory 816 can include a portion of storage resources on the device on which the electronic device 800 is installed, or it can be queried by the device, but not necessarily part of the device. For example, NVM/store 816 can be queried over a network via network interface 820.

In particular, system memory 812 and NVM/memory 816 can include temporary and permanent copies of instructions 824, respectively. The instructions 824 can include instructions that, when executed by at least one of the processors 804, cause the electronic device 800 to implement the construction method described above. In some embodiments, instructions 824, hardware, firmware, and/or software components thereof can additionally/alternatively be disposed in system control logic 808, network interface 820, and/or processor 804.

Network interface 820 can include a transceiver for providing a radio interface for electronic device 800 to communicate with any other suitable device (e.g., front-end module, antenna, etc.) over one or more networks. In some embodiments, network interface 820 can be integrated with other components of electronic device 800. For example, the network interface 820 can be integrated with at least one of the system memory 812, the NVM/memory 816, and a firmware device (not shown) having instructions that, when executed by at least one of the processors 804, the electronic device 800 implements the above-described construction method.

Network interface 820 can further include any suitable hardware and/or firmware to provide a multiple-input multiple-output radio interface. For example, network interface 820 can be a network adapter, a wireless network adapter, a telephone modem, and/or a wireless modem.

In one embodiment, at least one of the processors 804 can be packaged together with logic for one or more controllers of the system control logic 808 to form a SiP. In one embodiment, at least one of the processors 804 can be integrated on the same die as logic for one or more controllers of the system control logic 808 to form a system-on-chip (SoC).

The electronic device 800 can further include an input/output (I/O) device 832. I/O device 832 can include a user interface to enable a user to interact with electronic device 800; The peripheral component interface is designed so that the peripheral component can also interact with the electronic device 800. In some embodiments, the electronic device 800 further includes a sensor for determining at least one of environmental conditions and location information associated with the electronic device 800.

In some embodiments, the user interface can include, but is not limited to, a display (e.g., a liquid crystal display, a touch screen display, etc.), a speaker, a microphone, one or more cameras (e.g., still image cameras and/or cameras), a flashlight (e.g., a light emitting diode flash), and a keyboard.

In some embodiments, peripheral component interfaces can include, but are not limited to, non-volatile memory ports, audio jacks, and power interfaces.

In some embodiments, the sensors can include, but are not limited to, gyroscope sensors, accelerometers, proximity sensors, ambient light sensors, and positioning units. The positioning unit can also be part of or interact with the network interface 820 to communicate with components of the positioning network (e.g., a Global Positioning System (GPS) satellite).

The embodiments disclosed herein can be implemented in hardware, software, firmware, or a combination of these implementations. Embodiments of the present disclosure can be implemented as a computer program or program code executing on a programmable system including at least one processor, a storage system (including volatile and non-volatile memory and/or storage elements), at least one input device, and at least one output device.

Program code can be applied to the input instructions to perform the functions described herein and to generate output information. The output information can be applied to one or more output devices in a known manner. For purposes of this disclosure, a processing system includes any system having a processor such as, for example, a digital signal processor (DSP), a microcontroller, a disclosure specific integrated circuit (ASIC), or a microprocessor.

The program code can be implemented in a high-level programming language or an object-oriented programming language to communicate with the processing system. The program code can also be implemented in assembly language or machine language, if desired. Indeed, the mechanisms described herein are not limited in scope to any particular programming language. In either case, the language can be a compilation language or an interpretation language.

In some cases, the disclosed embodiments can be implemented in hardware, firmware, software, or any combination thereof. The disclosed embodiments can also be implemented as instructions carried by or stored on one or more temporary or non-temporary machine-readable (e.g., computer-readable) storage media, which can be read and executed by one or more processors. For example, the instructions can be distributed through a network or through other computer-readable media. Thus, a machine-readable medium can include any mechanism for storing or transmitting information in a form readable by a machine (e.g., a computer), including, but not limited to, a floppy disk, an optical disk, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the figures, some structural or methodological features can be shown in a particular arrangement and/or sequence. However, it should be understood that such a particular arrangement and/or ordering cannot be required. Rather, in some embodiments, these features can be arranged in a manner and/or sequence different from that shown in the illustrative figures. In addition, the inclusion of structural or methodical features in a particular figure is not meant to imply that such features are required in all embodiments, and that such features cannot be included or can be combined with other features in some embodiments.

It should be noted that each unit/module mentioned in each device embodiment of the present disclosure is a logical unit/module. Physically, a logical unit/module can be a physical unit/module, can be a part of a physical unit/module, or can be implemented in a combination of a plurality of physical units/modules. The physical implementation of these logical units/modules is not most important. The combination of functions implemented by these logical units/modules is the key to solving the technical problem proposed in the present disclosure. Furthermore, to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It is to be noted that in the examples and description of this patent, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one" does not rule out there are additional identical elements in the process, method, article, or apparatus that includes the element.

While the present disclosure has been illustrated and described with reference to certain preferred embodiments thereof, it will be understood by those of ordinary skill in the art that various changes can be made in form and detail without departing from the scope of the present disclosure.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: An alone; A and B; A, B and C; A, B, C, and D; and so forth. The bounds of an "and/or" list is defined by the complete set of combinations and permutations for the list.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as disclosed above.

The invention claimed is:

1. An apparatus comprising:
a memory for storing data in a database; and
a processor configured to:
determine that a syntax tree corresponding to an SQL query statement comprises a preset subtree by parsing the SQL query statement, wherein the preset subtree is an approximate nearest neighbor search (ANNS) subtree used to indicate a query mode for querying vector data, and wherein the preset subtree is separate from a WHERE subtree of the syntax tree corresponding to the SQL query statement;
determine the query mode for querying vector data according to the preset subtree and the SQL query statement by detecting the preset subtree in the SQL query statement, wherein determining the query mode for querying vector data is based on a first query algorithm and query parameters indicated by the SQL query statement, and wherein the query parameters include a number of returned rows and a virtual column; and
query the data in the database via the first query algorithm based on the query mode to determine query results, wherein determining the query results comprises:
determining a first query result set based on sorted data in the database, the number of returned rows and the virtual column, wherein the sorted data in the database is based on sorting the data in the database based on the first query algorithm and a similarity between a query vector in the SQL query statement and the data in the database;
extracting target data from the data in the database in batches based on the first query result set; and
combining the first query result set and the target data to determine a second query result as the query results;
the processor is further configured to:
determine that a syntax tree corresponding to another SQL query statement does not comprise the preset subtree by parsing the other SQL query statement;
determine a second query mode for querying scalar data according to the other SQL query statement; and
query the data in the database via a second query algorithm based on the second query mode to obtain a third query result.

2. The apparatus according to claim 1, wherein determining the query mode for querying vector data according to the preset subtree and the SQL query statement comprises:
selecting the first query algorithm from a set of preset query algorithms based on the preset subtree.

3. The apparatus according to claim 2, wherein querying the data in the database based on the query mode to determine query results comprises:
determining the similarity between the query vector in the SQL query statement and the data in the database based on the first query algorithm;

sorting the data in the database based on the first query algorithm and the similarity to obtain the sorted data in the database; and determining the query results based on the sorted data in the database and the query parameters.

4. The apparatus according to claim 3, wherein determining the similarity between the query vector in the SQL query statement and the data in the database based on the first query algorithm comprises:

determining a distance between the query vector in the SQL query statement and the data in the database based on the first query algorithm; and determining the similarity based on the value of the distance.

5. The apparatus according to claim 1, wherein determining the second query mode for querying scalar data according to the other SQL query statement comprises:

determining a query scalar, a number of returned rows, and a virtual column by parsing the other SQL query statement; and determining the third query result based on the query scalar, the number of returned rows, and the virtual column.

6. The apparatus according to claim 5, wherein determining the third query result based on the query scalar, the number of returned rows, and the virtual column comprises:

querying the data in the database based on the query scalar and the number of returned rows to obtain a fourth query result;

populating a virtual column result as a specified character, wherein the specified character includes 0; and combining the fourth query result and the virtual column result to obtain the third query result.

7. The apparatus according to claim 2, wherein selecting the first query algorithm from the set of preset query algorithms based on the preset subtree comprises:

determining the first query algorithm from the set of preset query algorithms based on an ANNS BY subtree, wherein the set of preset query algorithms comprise a Euclidean Metric, a Manhattan Distance, and/or an inner product algorithm.

8. A method performed by at least one processor, comprising:

determining that a syntax tree corresponding to an SQL query statement comprises a preset subtree by parsing the SQL query statement, wherein the preset subtree is an approximate nearest neighbor search (ANNS) subtree used to indicate a query mode for querying vector data, and wherein the preset subtree is separate from a WHERE subtree of the syntax tree corresponding to the SQL query statement;

determining the query mode for querying vector data according to the preset subtree and the SQL query statement by detecting the preset subtree in the SQL query statement, wherein determining the query mode for querying vector data is based on a first query algorithm and query parameters indicated by the SQL query statement, and wherein the query parameters include a number of returned rows and a virtual column;

querying the data in the database via the first query algorithm based on the query mode to determine query results, wherein determining the query results comprises:

determining a first query result set based on sorted data in the database, the number of returned rows and the virtual column, wherein the sorted data in the database is based on sorting the data in the database based on the first query algorithm and a similarity between a query vector in the SQL query statement and the data in the database;

extracting target data from the data in the database in batches based on the first query result set; and combining the first query result set and the target data to determine a second query result as the query results;

determining that a syntax tree corresponding to another SQL query statement does not comprise the preset subtree by parsing the other SQL query statement;

determining a second query mode for querying scalar data according to the other SQL query statement; and querying the data in the database via a second query algorithm based on the second query mode to obtain a third query result.

9. A non-transitory computer-readable storage medium having stored thereon instructions that, when executed on an electronic device, cause the electronic device to:

determine that a syntax tree corresponding to an SQL query statement comprises a preset subtree by parsing the SQL query statement, wherein the preset subtree is an approximate nearest neighbor search (ANNS) subtree used to indicate a query mode for querying vector data, and wherein the preset subtree is separate from a WHERE subtree of the syntax tree corresponding to the SQL query statement;

determine the query mode for querying vector data according to the preset subtree and the SQL query statement by detecting the preset subtree in the SQL query statement, wherein determining the query mode for querying vector data is based on a first query algorithm and query parameters indicated by the SQL query statement, and wherein the query parameters include a number of returned rows and a virtual column;

query the data in the database via the first query algorithm based on the query mode to determine query results, wherein determining the query results comprises:

determining a first query result set based on sorted data in the database, the number of returned rows and the virtual column, wherein the sorted data in the database is based on sorting the data in the database based on the first query algorithm and a similarity between a query vector in the SQL query statement and the data in the database;

extracting target data from the data in the database in batches based on the first query result set; and combining the first query result set and the target data to determine a second query result as the query results;

determine that a syntax tree corresponding to another SQL query statement does not comprise the preset subtree by parsing the other SQL query statement;

determine a second query mode for scalar data according to the other SQL query statement; and query the data in the database via a second query algorithm based on the second query mode to obtain a third query result.

10. The non-transitory computer-readable storage medium according to claim 9, wherein determining the query mode for querying vector data according to the preset subtree and the SQL query statement comprises:

selecting the first query algorithm from a set of preset query algorithms based on the preset subtree.

11. The non-transitory computer-readable storage medium according to claim 10, wherein querying the data in the database based on the query mode to determine query results comprises:
    determining the similarity between the query vector in the SQL query statement and the data in the database based on the first query algorithm;
    sorting the data in the database based on the first query algorithm and the similarity to obtain the sorted data in the database; and
    determining query results based on the sorted data in the database and the query parameters.

12. The non-transitory computer-readable storage medium according to claim 11, wherein determining the similarity between the query vector in the SQL query statement and the data in the database based on the first query algorithm comprises:
    determining a distance between the query vector in the SQL query statement and the data in the database based on the first query algorithm; and
    determining the similarity based on value of the distance.

13. The non-transitory computer-readable storage medium according to claim 9, wherein determining the second query mode for querying scalar data according to the other SQL query statement comprises:
    determining a query scalar, a number of returned rows, and a virtual column by parsing the other SQL query statement; and
    determining the third query result based on the query scalar, the number of returned rows, and the virtual column.

14. The non-transitory computer-readable storage medium according to claim 13, wherein determining the third query result based on the query scalar, the number of returned rows, and the virtual column comprises:
    querying the data in the database based on the query scalar and the number of returned rows to obtain a fourth query result;
    populating a virtual column result as a specified character, wherein the specified character includes 0; and
    combining the fourth query result and the virtual column result to obtain the third query result.

15. The non-transitory computer-readable storage medium according to claim 10, wherein selecting the first query algorithm from the set of preset query algorithms based on the preset subtree comprises:
    determining the first query algorithm from the set of preset query algorithms based on an ANNS BY subtree, wherein the set of preset query algorithms comprise a Euclidean Metric, a Manhattan Distance, and/or an inner product algorithm.

\* \* \* \* \*